United States Patent [19]

Swinkels et al.

[11] 4,263,109

[45] Apr. 21, 1981

[54] PRECIPITATION OF CHLORIDE FROM ZINC SULPHATE SOLUTION

[75] Inventors: Godefridus M. Swinkels, Rossland; Horst E. Hirsch, Trail; Michael J. Fairweather; Ernest G. Parker, both of Rossland, all of Canada

[73] Assignee: Cominco Ltd., Vancouver, Canada

[21] Appl. No.: 135,588

[22] Filed: Mar. 31, 1980

[51] Int. Cl.$^3$ ............................................. C25C 1/16
[52] U.S. Cl. .................................................. 204/119
[58] Field of Search ........................................ 204/119

[56] References Cited

U.S. PATENT DOCUMENTS

| | | | |
|---|---|---|---|
| 2,396,569 | 3/1946 | Griffith et al. | 204/119 |
| 3,826,648 | 7/1974 | Bodson | 75/109 |

*Primary Examiner*—R. L. Andrews

*Attorney, Agent, or Firm*—Arne I. Fors; Robert F. Delbridge

[57] ABSTRACT

A process is described for the removal of chloride impurity from zinc sulphate solution. The process comprises the steps of forming a slurry of said solution with an inert particulate support material having elemental silver dispersed thereon, and an oxidizing agent, agitating said slurry at a temperature between about 60° and about 100° C. for precipitation of silver chloride on said support material, filtering said slurry to separate purified zinc sulphate solution from the support material containing the precipitated silver chloride, and treating said separated support material containing precipitated silver chloride with a reductant in an aqueous alkaline medium to regenerate elemental silver on said support material.

9 Claims, No Drawings

PRECIPITATION OF CHLORIDE FROM ZINC SULPHATE SOLUTION

BACKGROUND OF THE INVENTION

This invention relates to the purification of zinc sulphate solution and, in particular, relates to the removal of chloride impurity from aqueous solutions of zinc sulphate intended for use in the electrolytic recovery of zinc.

The presence of chloride in zinc sulphate solution, which may be introduced into the solution during hydrometallurgical treatment of zinc sulphide concentrate, e.g., during pressure leaching with sulphuric acid, has a deleterious effect on electrodes during electrolysis. For example, leaching of a typical Mississippi Valley-type concentrate containing 55% Zn and 0.08% Cl in a single pass of return acid from zinc electrolysis may dissolve about 145 mg/L chloride. To avoid deleterious effects of chloride during electrolysis, this chloride should not exceed 100 mg/L. Use of return acid initially containing 100 mg/L chloride would produce a leach solution containing about 245 mg/L in the next pass and, without chloride removal, the amount of chloride in solution would increase as cycling of return acid continues. It is therefore evident that a process is required in which all the solution being used in electrolysis is treated to decrease the chloride to not more than 100 mg/L or a portion of the electrolyte is treated for substantially complete removal of chloride and then mixed with untreated solution. The latter is considered to be more economic.

It is noted in U.S. Pat. No. 1,403,065 that corrosion of electrodes is largely reduced if chloride is removed from the electrolyte prior to the electrolysis of zinc-bearing solution. A method of chloride removal is provided wherein a portion of solution is withdrawn from the circuit, treated with a soluble silver salt to precipitate silver chloride, and purified solution is returned to the circuit. The silver chloride is reduced to metallic silver and reconverted into a soluble salt for re-use. In more detail, the portion of zinc-bearing solution to be treated is made slightly acid with sulphuric acid and finely powdered silver sulphate is added. The mixture is agitated for about one hour and then rendered neutral or slightly basic to coagulate silver chloride. The precipitate is allowed to settle and clear solution is decanted and treated with zinc dust to remove traces of silver. Sulphuric acid and zinc dust are added to bottom solution and silver chloride filter cake to reduce silver chloride to metallic silver. When reduction is complete, the precipitate of metallic silver is agitated for some time in slightly acid solution to ensure complete dissolving of excess zinc dust. The silver precipitate is washed with water until free of chloride and then dried and heated with pure sulphuric acid to 250°–300° C. to convert all the silver to sulphate. This is ground to a fine powder for re-use. Each cycle takes nearly 3 days to complete and, in an ongoing operation, a large inventory of costly silver is required. In 1936 AIME Transactions 121, pages 503–4, silver recoveries by this method are reported to be 97.5 to 98 percent per cycle, i.e., silver losses are about 2 percent per cycle.

SUMMARY OF THE INVENTION

We have found that chloride impurities can be substantially removed from zinc sulphate solution by reacting the solution with elemental silver dispersed on a particulate inert support material and with an oxidizing agent at a temperature between about 60° and 100° C., preferably between about 60° and 80° C. to form silver chloride precipitate, separating purified zinc sulphate solution from the support material containing silver chloride by filtration and treating the silver chloride with a reductant in an aqueous alkaline medium to convert the silver to its elemental state for cyclic re-use in the process. More particularly, our invention comprises treating zinc sulphate solution with elemental silver in the presence of an oxidizing agent in the form of ferric iron, e.g., ferric sulphate, to precipitate silver chloride and form ferrous sulphate. In a preferred modification of the invention, a small amount of ferric iron that remains in the zinc sulphate solution as an impurity after an iron precipitation step is used as the oxidant and this ferric iron is maintained in adequate abundance by stage-wise additions of hydrogen peroxide to provide almost immediate re-oxidation of ferrous sulphate that is formed.

It is the principal object of the present invention to provide an efficient process for the purification of zinc sulphate solution to a desired extent by the removal of chloride impurity as a silver chloride precipitate with minimum loss of silver.

DESCRIPTION OF PREFERRED EMBODIMENTS

The process of our invention will now be first described with reference to a series of small scale tests for treatment of zinc sulphate solutions containing 140–150 mg/L Zn, 3–5 g/L free acid as $H_2SO_4$ and 300 g/L Cl with elemental silver reagent dispersed on a particulate inert support material in the presence of an oxidant in sufficient amount to provide stoichiometric oxidation of the silver required to precipitate the chloride as AgCl. Preparation of supported silver reagent was effected by mixing the support material in water and adding an appropriate quantity of silver nitrate solution. Sufficient sodium chloride solution was then added to precipitate the silver as silver chloride. The slurry was mixed for about 15 minutes and filtered on a pressure filter. The filter cake was repulped with water and filtered again. The silver was reduced to the elemental state by reaction of the aqueous slurry under pressure at 95° C. with hydrogen in the presence of sodium hydroxide. Chloride precipitation tests were carried out in which stoichiometric quantities of silver comprised 10 or 20 percent of the dry weights of the beds containing silver and support material. The following support matrix materials were tested:

Diatomite (fine powder)
Carbon (−12+40 mesh and powdered)
Fused alumina (150 mesh)
Silicon carbide (180 grit powder)

Chloride precipitation tests were carried out between 60° and 80° C. with sufficient agitation of slurries to maintain good suspension of the solids.

Although some differences due to matrix materials were observed, choice of matrix material was not critical. In the preparation and regeneration of diatomite beds, reduction of precipitated silver chloride to elemental silver was more rapid at 45 psig hydrogen pressure than the reduction of silver chloride precipitated on fused alumina and silicon carbide beds. For example, hydrogen regenerations of diatomite beds were substantially complete in 60 minutes, while regenerations of fused alumina beds were only about 75% complete in 60 minutes and about 97% complete in 120 minutes. At 200 psig pressure, diatomite beds were completely regenerated in 30 minutes. At 45 psig hydrogen pressure, silicon carbide beds were similar to fused alumina beds, but required 30 minutes at 200 psig pressure for 97% regeneration.

Moisture retained in filter cakes obtained with fused alumina and silicon carbide beds was 40–60% of the dry weight of the beds, while, with diatomite beds, filter cake moisture was about 100% of the dry weight. Zinc sulphate solution was removed more readily from the silicon carbide and alumina beds.

Weight losses of diatomite beds due to dissolving of some silica during regeneration in an alkaline medium were observed. The other materials had an advantage over carbon which had a tendency to absorb ions other than chloride ions.

In order to precipitate chloride ions as AgCl, an oxidizing agent is required to oxidize the elemental silver to the monovalent state. Several oxidizing agents were tested. Potassium permanganate and ozone were effective oxidants. However, when they were used, manganese, which is usually present in the zinc sulphate solution, precipitated as difficult-to-filter manganic oxides.

Ninety percent of the chloride was removed from solution containing 300 mg/L Cl by precipitation with silver at 70° C. in the presence of 25 g/L potassium peroxidisulphate ($K_2S_2O_8$). This method led to accumulation of $K_2SO_4$ in the solution which could not be removed conveniently. With operation at 70° C. and use of hydrogen peroxide in the amount of seven times the stoichiometric requirement to oxidize the elemental silver combining with chloride, 90 percent of the chloride was removed from solution containing 300 mg/L Cl in 20 minutes. With less hydrogen peroxide, results were erratic. For example, as little as 28 percent of the chloride was precipitated when 3–5 times the stoichiometric requirement of hydrogen peroxide for the reaction were used according to equation:

$$2Ag° + H_2O_2 + 2HCl \rightarrow 2AgCl + 2H_2O \qquad (1)$$

Titration of treated solutions with potassium permanganate showed complete consumption of added hydrogen peroxide within 15 minutes. It was evident that the hydrogen peroxide was decomposing rapidly in the presence of the elemental silver by the reaction of equation 2:

$$H_2O_2 \rightarrow H_2O + \tfrac{1}{2}O_2 \qquad (2)$$

Successive additions of hydrogen peroxide did not result in adequate precipitation of chloride.

Chloride precipitation using ferric iron as the oxidant was successfully carried out by the following reaction:

$$Fe_2(SO_4)_3 + 2Ag° + 2HCl \rightarrow 2AgCl + 2FeSO_4 + H_2SO_4 \qquad (3)$$

For the removal of 300 mg/L chloride, a stoichiometric requirement of 470 mg/L ferric iron is indicated. With this amount of ferric iron, 76 percent of the chloride was precipitated in 30 minutes while 83 percent was precipitated in 90 minutes. With the use of twice this stoichiometric amount of ferric iron, obtained by adding ferric sulphate, 96 percent of the chloride was removed in 45 minutes.

In downstream neutralization of zinc sulphate solution, the presence of 100–200 mg/L ferric iron is acceptable. It assists in removing trace impurities such as As, Ge and Se. Larger amounts of ferric iron tend to impede the filtration which follows the neutralization. A test was made in which use of 200 mg/L ferric iron, i.e. 0.43 or about one-half the stoichiometric requirement for removal of 300 ml/L chloride, was supplemented by slowly sparging the slurry with an excess of gaseous oxygen. After a retention time of 90 minutes, only 56 percent of the chloride was precipitated. Tests in which the 200 mg/L ferric iron were supplemented by stagewise additions of hydrogen peroxide resulted in the removal of as much as 85 percent of the chlorine within 30 minutes, a third of the time required as compared to the use of oxygen as an oxidant. Additional tests revealed that oxidation of ferrous iron with hydrogen peroxide, according to Equation 4, is almost quantitative and instantaneous under conditions prevailing during chloride removal:

$$2FeSO_4 + H_2SO_4 + H_2O_2 \rightarrow Fe_2(SO_4)_3 + 2H_2O \qquad (4)$$

We then discovered that staged additions of stoichiometric amounts of hydrogen peroxide during chloride precipitation by the reaction of Equation 3 resulted in regeneration of ferric iron in situ by the reaction of Equation 4 before decomposition of hydrogen peroxide by the reaction of Equation 2 occurred. This is valuable in the treatment of zinc sulphate solutions obtained by pressure leaching of zinc sulphide concentrates wherein solutions containing 100–200 mg/L ferric iron are obtained. By successive regeneration of this ferric iron by additions of hydrogen peroxide to oxidize ferrous iron formed, additions of ferric iron that may lead to downstream filtration problems are not required.

Also in small scale tests, formaldehyde and hydrogen regenerations of silver chloride containing beds of precipitant were carried out in aqueous suspensions containing sodium hydroxide. With formaldehyde treatments at 70° C., conversions to elemental silver were virtually 100 percent within 15 minutes according to the following equation:

$$2AgCl + HCHO + 2NaOH \rightarrow 2Ag° + 2NaCl + HCOOH + H_2O \qquad (5)$$

Although formaldehyde is an effective reductant of silver chloride, it is costly and there are environmental problems associated with the disposal of waste solutions containing formaldehyde and the formic acid produced by the reaction. Regeneration with hydrogen at 100° C. and 45–200 psig pressure in an alkaline solution was found to be reasonably rapid and produced no noxious by-products. This reaction proceeds according to the following equation:

$$2AgCl + H_2 + 2NaOH \rightarrow 2Ag° + 2NaCl + 2H_2O \qquad (6)$$

Larger scale tests were then carried out in which beds comprising the foregoing matrix materials and 10% or 20% silver were used cyclically wherein washed filter cakes from chloride precipitation were repulped to 1.5 liters with water, sodium hydroxide was added and the slurry was treated in an autoclave with hydrogen at 95° C. for re-use. Hydrogen pressures of 45, 100 and 200 psig were applied for periods of 0.25 to 20 hours in different tests. Treated slurries were filtered and the beds containing regenerated silver precipitant were washed with water. In the precipitation of chloride, 25 liter batches of zinc sulphate solution containing 300 mg/L chloride, 200 mg/L ferric iron and 3 to 5 g/L free acid as $H_2SO_4$ were stirred with beds containing elemental silver for periods of 15, 30 or 60 minutes at temperatures between 60° and 80° C. during which time stage-wise additions of stoichiometric quantities of hydrogen peroxide for the oxidation of $FeSO_4$ formed by Equation 3 were made. The temperature could be raised to the boiling point of the solution without need of a pressure vessel. At temperatures below 60° C., longer reaction times were found to be required. The slurries were then filtered and the filter cakes were washed and weighed.

In one test, a bed containing 22.75 g elemental silver in 91 g fine fused alumina matrix material was prepared as previously stated and added to 25 liters of impure zinc sulphate solution containing 200 mg/L ferric iron and 300 mg/L chloride. The slurry was agitated at 70° C. while 36 ml hydrogen peroxide solution containing 100 g/L $H_2O_2$ were added in stages over the first 10 minutes of processing. After 30 minutes the slurry was filtered. The filtrate assayed 15 mg/L chloride, indicating that 95 percent of the chloride in the impure solution had been removed. The bed containing the silver chloride was washed on the filter and then transferred to an autoclave where the volume was adjusted to 1.5 liter by addition of water, 12.65 g sodium hydroxide was added and the autoclave was pressurized with hydrogen gas to 45 psig. The temperature was raised to 95° C. and strong agitation was provided to ensure adequate gas incorporation. Stirring was continued for 2 hours. Then the pressure was released and the slurry was filtered and washed. Chloride remaining in the bed was determined to be 0.15 g, i.e., 98% of the chloride retained by the bed from the previous treatment of the zinc sulphate solution was removed in the hydrogen regeneration. The bed was then ready for another cycle of chloride precipitation and silver regeneration. With the same amount of silver comprising 10% of another fused alumina bed, there were 4 cycles with 45 psig hydrogen pressure during regeneration followed by 2 cycles at 100 psig and one at 200 psig hydrogen pressure. Regeneration was more rapid at elevated pressures, being 95 percent complete in 15 minutes at 200 psig. Operation with a silicon carbide bed containing 10 percent silver was similar, with regeneration at 200 psig providing 97 percent regeneration of the silver in 30 minutes.

In a test wherein 22.75 g elemental silver comprised 10 percent of a 227.5 g bed having a diatomite matrix material, the bed was mixed with 25 liters impure zinc sulphate solution containing 200 mg/L ferric iron and 300 mg/L chloride. In a cyclic operation having 6 chloride removal and silver regeneration steps, chloride removals ranged between 85 percent and 91 percent for the first 4 steps which had 30 minute retention times, and were 82 percent in the 5th and 6th steps when the retention time was decreased to 15 minutes. Regeneration with hydrogen at 45 psig of silver chloride in the bed after each chloride removal step was 97 percent complete within 45 minutes when compared with formaldehyde regenerations of portions of the beds in three of the regeneration steps. Formaldehyde has been previously shown to regenerate all the silver chloride in the bed. In this sequence of chloride removals and silver regenerations, losses in weight of the diatomite totalling 18 percent of that initially present was believed to be due to dissolving of part of the diatomite silica in the sodium hydroxide in the regeneration steps. Therefore it is advantageous to use more refractory materials such as fused silica, sand, fused alumina and silicon carbide powder as matrices for the elemental silver precipitant. These materials also retain less water than diatomite or carbon and are more easily washed after precipitation and regeneration.

The foregoing tests indicate that about 90% of the chloride in impure zinc sulphate solution containing about 300 mg/L chloride may be removed in about 15 minutes by treatment between about 60° and about 100° C. with vigorous mixing of a slurry comprising the solution, elemental silver dispersed on an inert particulate support material and an oxidizing agent in the form of ferric iron. Less than stoichiometric quantities of ferric iron provide effective oxidation when ferrous iron formed in the reaction is oxidized to ferric iron by stage-wise additions of hydrogen peroxide during the mixing period. Silver chloride precipitated in the bed of support material may be converted to the elemental silver by hydrogen reduction in an aqueous alkaline medium with vigorous stirring at elevated temperature and pressure, 95% regeneration of elemental silver being obtained in 15-30 minutes at about 100° C. and 40-200 psig pressure. The particulate inert support material may be diatomite, fused silica, sand, fused alumina or silicon carbide powder. Beds comprising silver supported on these matrices may be used cyclically. Silver losses to hydrogen reduction filtrate (purified zinc sulphate solution) and wash waters have been estimated to be about 0.25 percent per cycle.

Since chloride removal and bed regeneration reactions are rapid, continuous treatment of zinc sulphate solution produced for electrolytic recovery of zinc may be carried out without maintaining a large inventory of silver-containing reagent.

It will be understood, of course, that modifications can be made in the embodiments of the invention described herein without departing from the scope and purview of the invention as defined by the appended claims.

What we claim as new and desire to protect by Letters Patent of the United States is:

1. A process for the removal of chloride impurity from zinc sulphate solution comprising the steps of forming a slurry of said solution with an inert particulate support material having elemental silver dispersed thereon, and an oxidizing agent; agitating said slurry at a temperature between about 60° and about 100° C. for precipitation of silver chloride on said support material; filtering said slurry to separate purified zinc sulphate solution from the support material containing the precipitated silver chloride; and treating said separated support material containing precipitated silver chloride with a reductant in an aqueous alkaline medium to regenerate elemental silver on said support material.

2. A process for the removal of chloride impurity from zinc sulphate solution containing chloride comprising the steps of forming a slurry of said solution with a bed comprising an inert particulate support material having elemental silver dispersed thereon, and an oxidizing agent in the form of ferric iron; heating said slurry to a temperature between 60° and 80° C. and continuously mixing said slurry for 15 to 20 minutes to maintain said support material in suspension; filtering said slurry to separate support material containing precipitated silver chloride from purified zinc sulphate solution; and treating said separated support material containing precipitated silver chloride with a reductant at elevated temperature and pressure in an aqueous alkaline medium to regenerate elemental silver on said support material.

3. A process as claimed in claim 2, in which the amount of said ferric iron is at least the stoichiometric requirement to oxidize elemental silver in the bed for precipitation of chloride in the solution as silver chloride.

4. A process as claimed in claim 2, in which the amount of said ferric iron is about twice the stoichiometric requirement to oxidize elemental silver in the bed for precipitation of chloride in the solution as silver chloride.

5. A process as claimed in claim 3 or 4, wherein said ferric iron is added as ferric sulphate.

6. A process as claimed in claim 2, in which the amount of said ferric iron is less than the stoichiometric requirement to oxidize elemental silver in the bed for precipitation of the chloride in the solution as silver chloride, and ferrous iron formed in the silver oxidation and chloride precipitation reaction is oxidized to ferric iron by stagewise additions of hydrogen peroxide to said slurry during said mixing wherein the ferric iron thus formed is sufficient to complete the precipitation of the chloride in said zinc sulphate solution.

7. A process as claimed in claim 6, in which the amount of ferric iron is about one-half the stoichiometric requirement to oxidize elemental silver and the hydrogen peroxide is added stagewise in stoichiometric amounts required to oxidize the ferrous iron to ferric iron.

8. A process as claimed in claim 2, 3 or 4, in which said reductant is hydrogen and support material containing precipitated silver chloride is treated with said hydrogen at about 100° C. and 45–200 psig pressure and slurry containing said support material is agitated to provide good dispersal of said hydrogen in the slurry.

9. A process as claimed in claim 1, 3 or 4, in which said inert particulate support material is selected from the group consisting of diatomite, fused silica, sand, fused alumina and silicon carbide powder.

* * * * *